(12) United States Patent
Imai (10) Patent No.: US 12,304,382 B2
(45) Date of Patent: May 20, 2025

(54) VEHICLE HEADLIGHT CONTROL SYSTEM

(71) Applicant: TOYOTA JIDOSHA KABUSHIKI KAISHA, Toyota (JP)

(72) Inventor: Toshiaki Imai, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 18/340,091

(22) Filed: Jun. 23, 2023

(65) Prior Publication Data

US 2023/0415635 A1 Dec. 28, 2023

(30) Foreign Application Priority Data

Jun. 28, 2022 (JP) .................. 2022-103701

(51) Int. Cl.
*B60Q 1/14* (2006.01)
(52) U.S. Cl.
CPC ......... *B60Q 1/1469* (2013.01); *B60Q 1/1423* (2013.01); *B60Q 1/1476* (2013.01)
(58) Field of Classification Search
CPC ................ B60Q 1/143; B60Q 2300/42; B60Q 2300/056; B60Q 2300/112; B60Q 2300/41; B60Q 1/085; B60Q 1/1423; B60Q 2300/314; B60Q 2300/45; B60Q 1/14; B60Q 1/12
See application file for complete search history.

(56) References Cited

U.S. PATENT DOCUMENTS

2020/0114806 A1 4/2020 Doi et al.
2020/0150702 A1* 5/2020 Ueda .................. G05D 1/43
2020/0298922 A1* 9/2020 Saeki .................. B62J 6/024
2021/0023980 A1 1/2021 Shimada et al.
2021/0031677 A1 2/2021 Doi et al.
2021/0284060 A1* 9/2021 Shimada ............. H05B 47/115

FOREIGN PATENT DOCUMENTS

| JP | S60-121237 U | 8/1985 |
|----|----|----|
| JP | 2020-062929 A | 4/2020 |
| WO | 2019/194212 A1 | 10/2019 |

OTHER PUBLICATIONS

Japanese Office Action dated Oct. 29, 2024 in Japanese Patent Application No. 2022-103701 with English machine translation.

* cited by examiner

*Primary Examiner* — Wei (Victor) Y Chan
(74) *Attorney, Agent, or Firm* — Dickinson Wright, PLLC (57) ABSTRACT

A vehicle headlight control system, includes: an operation section configured to adopt a first position and a second position by being rotated with respect to a lever body; a biasing section that returns the operation section to the first position; and a processor coupled to a memory, the processor configured to enable control of vehicle sidelights and low-beam headlights; a first display portion that indicates a relative position of the operation section with respect to the lever body; and a second display portion that is adjacent to the first display portion in a case in which the operation section is at the first position, and that indicates either being in an automatic illumination state in which the illumination state of the vehicle sidelights and the low-beam headlights is switchable automatically or being in a vehicle sidelight illumination state in which the vehicle sidelights are illuminated.

3 Claims, 7 Drawing Sheets

VEHICLE HEADLIGHT CONTROL SYSTEM

CROSS-REFERENCE TO RELATED APPLICATION

This application is based on and claims priority under 35 USC 119 from Japanese Patent Application No. 2022-103701 filed on Jun. 28, 2022, the disclosure of which is incorporated by reference herein.

BACKGROUND

Technical Field

The present disclosure relates to a vehicle headlight control system.

Related Art

An invention related to a vehicle lever switch is disclosed in Japanese Patent Application Laid-Open (JP-A) No. 2020-62929. This vehicle lever switch includes a rotational operator (operation section) capable of rotating with respect to a lever body. The rotational operator is configured so as to return automatically to an automatic lights switch position when a rotation operation force is no longer being imparted thereto when between an automatic lights switch position and a lights off switch position. The related art according to JP-A No. 2020-62929 is accordingly able to suppress a vehicle from running without lights.

However, in the related art according to JP-A No. 2020-62929, there are sometimes situations in which only vehicle sidelights are illuminated under specific circumstances even though the rotational operator is in the automatic lights switch position, and the position of the rotational operator and the actual state of the headlights do no match sometimes, with this conceivably causing the driver of the vehicle to feel confused.

SUMMARY

The present disclosure provides a vehicle headlight control system capable of suppressing a driver from feeling confused about a state of headlights while also suppressing a vehicle from traveling without lights.

A vehicle headlight control system according to a first aspect of the present disclosure includes an operation section, a biasing section, a headlight control section, a first display portion, and a second display portion. The operation section is configured to adopt a first position and a second position by being rotated with respect to a lever body. The biasing section returns the operation section to the first position in a case in which the operation section has been rotated toward a second position side. The headlight control section is configured to enable an illumination state of vehicle sidelights and low-beam headlights to be switched automatically in a case in which the operation section is at the first position, enable the low-beam headlights and the vehicle sidelights to be switched off in a case in which the operation section is at the second position for a specific period of time or greater, and enable the vehicle sidelights to be illuminated in a case in which the operation section is at the second position for a duration shorter than the specific period of time. The first display portion indicates a relative position of the operation section with respect to the lever body. The second display portion is adjacent to the first display portion in a case in which the operation section is at the first position, and indicates either being in an automatic illumination state in which the illumination state of the vehicle sidelights and the low-beam headlights is switchable automatically or being in a vehicle sidelight illumination state in which the vehicle sidelights are illuminated.

The first aspect of the present disclosure is provided with the operation section that is rotatable with respect to the lever body, and the operation section is configured to adopt the first position and the second position by being rotated with respect to the lever body.

Moreover, in the present disclosure the operation section is rotated by the biasing section in a case in which the operation section has reached the second position, and the operation section is thereby returned to the first position. Namely, the operation section needs to be supported such that the operation section is not rotated in order to maintain the state of the operation section positioned at the second position.

Moreover, the present disclosure is provided with the headlight control section, and the headlight control section is able to set the automatic illumination state in which the illumination state of the vehicle sidelights and the low-beam headlights is switchable automatically in a case in which the operation section is at the first position.

Moreover, the headlight control section is able to switch off the vehicle sidelights and the low-beam headlights in a case in which the operation section is at the second position for the specific period of time or greater.

Furthermore, the headlight control section is able to set the vehicle sidelight illumination state in which the vehicle sidelights are illuminated in a case in which the operation section is at the second position for a duration shorter than the specific period of time.

Moreover, the present disclosure enables the relative position of the operation section with respect to the lever body to be indicated by the first display portion. This thereby enables, for example, a driver to ascertain a state of the headlights of the vehicle by providing the mark indicating the automatic illumination state and the mark indicating the vehicle sidelight illumination state, and the other marks at the position adjacent to the first display portion in a case in which the operation section is at each respective position. Note that the headlights referred to here include at least one out of the vehicle sidelights or the low-beam headlights.

However, as stated above, in the present disclosure in a case in which the operation section is in the first position, this sometimes means being in the automatic illumination state and sometimes means being in the vehicle sidelight illumination state. Therefore, were one or other of the mark indicating the automatic illumination state or the mark indicating the vehicle sidelight illumination state alone to be provided at a position adjacent to the first display portion in a case in which the operation section is at the first position, then depending on the actual state of the headlights of the vehicle this might conceivably lead to the driver of the vehicle feeling confused about the state of the headlights of the vehicle.

To address this issue, in the present disclosure the second display portion is provided, and the second display portion is arranged at a position adjacent to the first display portion in a case in which the operation section is at the first position and indicates either being in the automatic illumination state or in the vehicle sidelight illumination state.

This means that the driver of the vehicle is able to ascertain that the state of the headlights is either the automatic illumination state or the vehicle sidelight illumination state by looking at an adjacent state of the first display portion and the second display portion.

A vehicle headlight control system according to a second aspect of the present disclosure is the first aspect of the present disclosure, wherein the headlight control section is further configured to, in a state in which the low-beam headlights are illuminated, switch off the low-beam headlights and illuminate the vehicle sidelights in a case in which the operation section has reached the second position.

In the second aspect of the present disclosure, in a state in which the low-beam headlights are illuminated, the low-beam headlights are switched off and the vehicle sidelights are illuminated by the headlight control section in a case in which the operation section has reached the second position. Thereby the present disclosure enables a quick transition to the vehicle sidelight illumination state based on operation of the driver.

A vehicle headlight control system according to a third aspect of the present disclosure is the first aspect of the present disclosure, wherein the headlight control section is further configured to, in a state in which the low-beam headlights are illuminated, switch off the low-beam headlights and illuminate the vehicle sidelights in a case in which the operation section has reached the first position from being at the second position.

In the third aspect of the present disclosure, in a state in which the low-beam headlights are illuminated, the low-beam headlights are switched off and the vehicle sidelights are illuminated by the headlight control section in a case in which the operation section has reached the first position from being at the second position. The present disclosure is accordingly able to suppress the vehicle sidelight illumination state while the operation section is returning to the first position from the second position.

As described above, the vehicle headlight control system according to the first aspect of the present disclosure exhibits the excellent advantageous effect of enabling a driver to be suppressed from feeling confused about a state of headlights while also suppressing a vehicle from traveling without lights.

The vehicle headlight control system according to the second aspect of the present disclosure exhibits the excellent advantageous effect of enabling a driver to be suppressed from feeling confused about a state of vehicle sidelights by quickly reflecting operation by the driver of the vehicle sidelights.

The vehicle headlight control system according to the third aspect of the present disclosure exhibits the excellent advantageous effect of facilitating a driver to ascertain the position of the operation section when the vehicle sidelights are illuminated.

BRIEF DESCRIPTION OF THE DRAWINGS

Exemplary embodiments of the present disclosure will be described in detail based on the following figures, wherein.

DETAILED DESCRIPTION

Description follows regarding an example of an exemplary embodiment of a "vehicle headlight system 10" according to the present disclosure, with reference to FIG. 1 to FIG. 7. Note that as appropriate in the drawings, an arrow UP indicates a vehicle upward side of a vehicle 12 installed with the vehicle headlight system 10, and an arrow RH indicates a vehicle width direction right side thereof.

Figure 1:
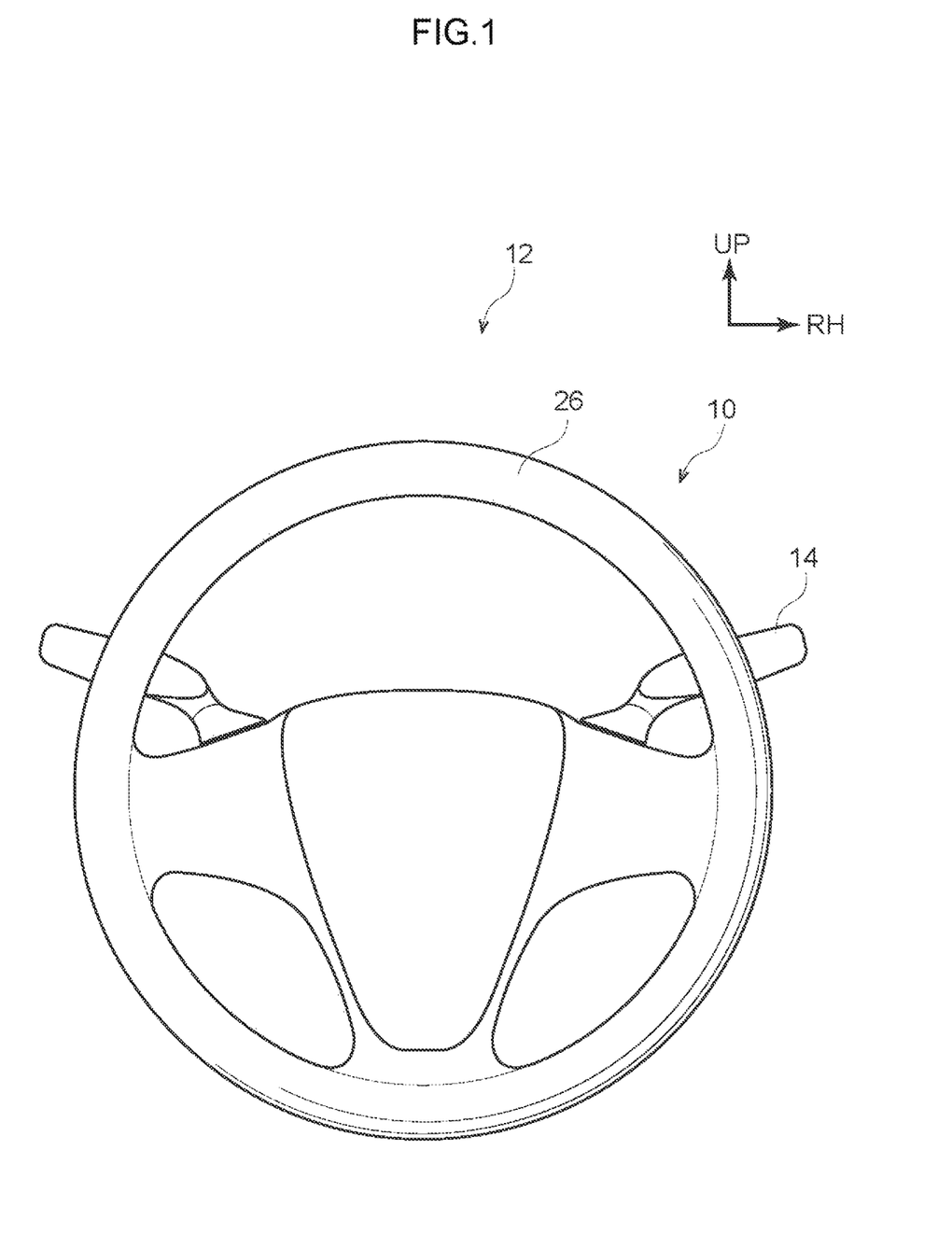
FIG. 1 is a schematic diagram illustrating a schematic configuration of a lever switch periphery in a vehicle installed with a vehicle headlight system according to the present exemplary embodiment.
Figure 4:
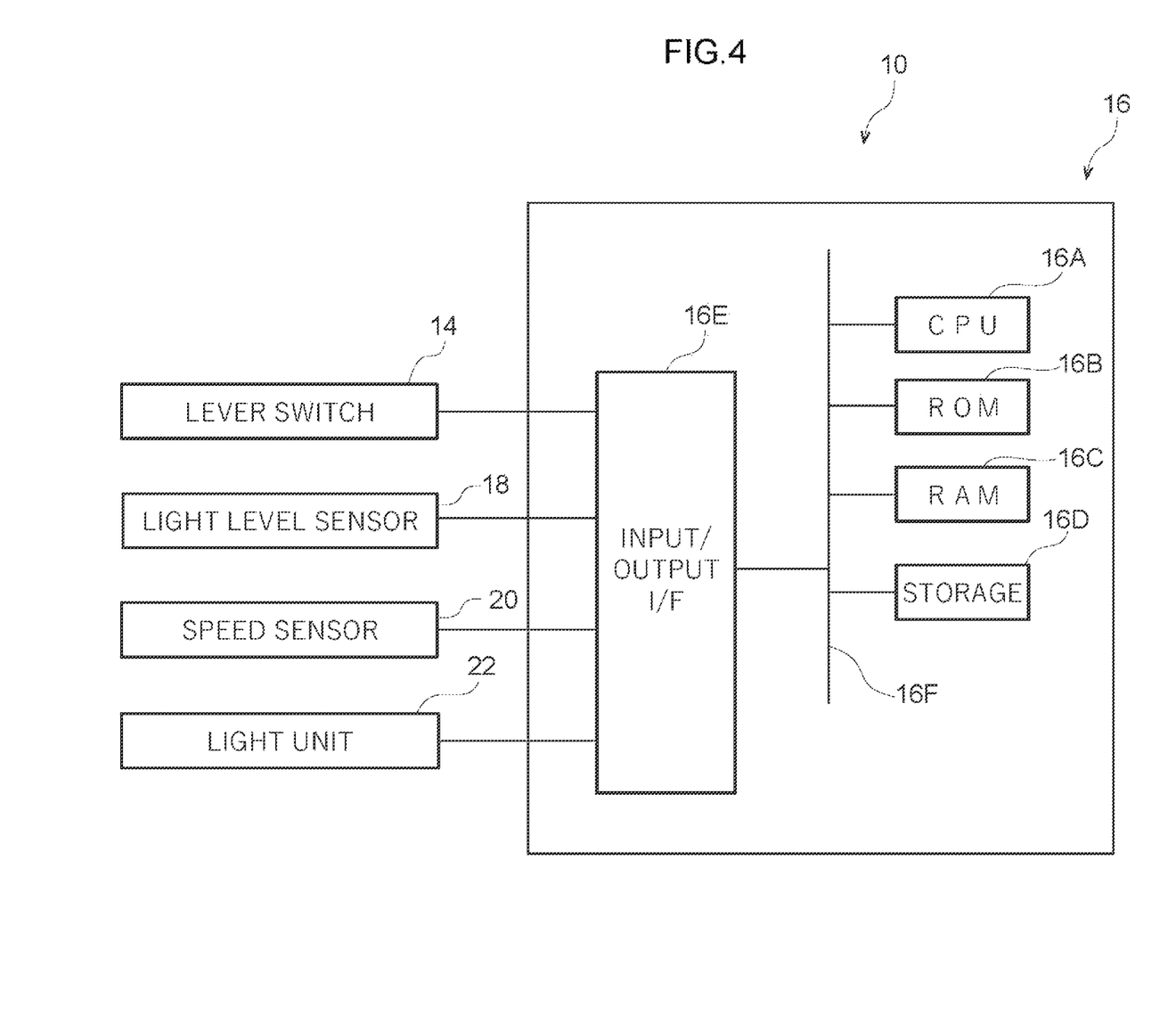
FIG. 4 is a block diagram illustrating a hardware configuration of a vehicle headlight system according to the present exemplary embodiment.

As illustrated in FIG. 1 and FIG. 4, the vehicle headlight system 10 is configured including a lever switch 14, a control device 16, a light level sensor 18, a speed sensor 20, and a light unit 22.

Figure 2:
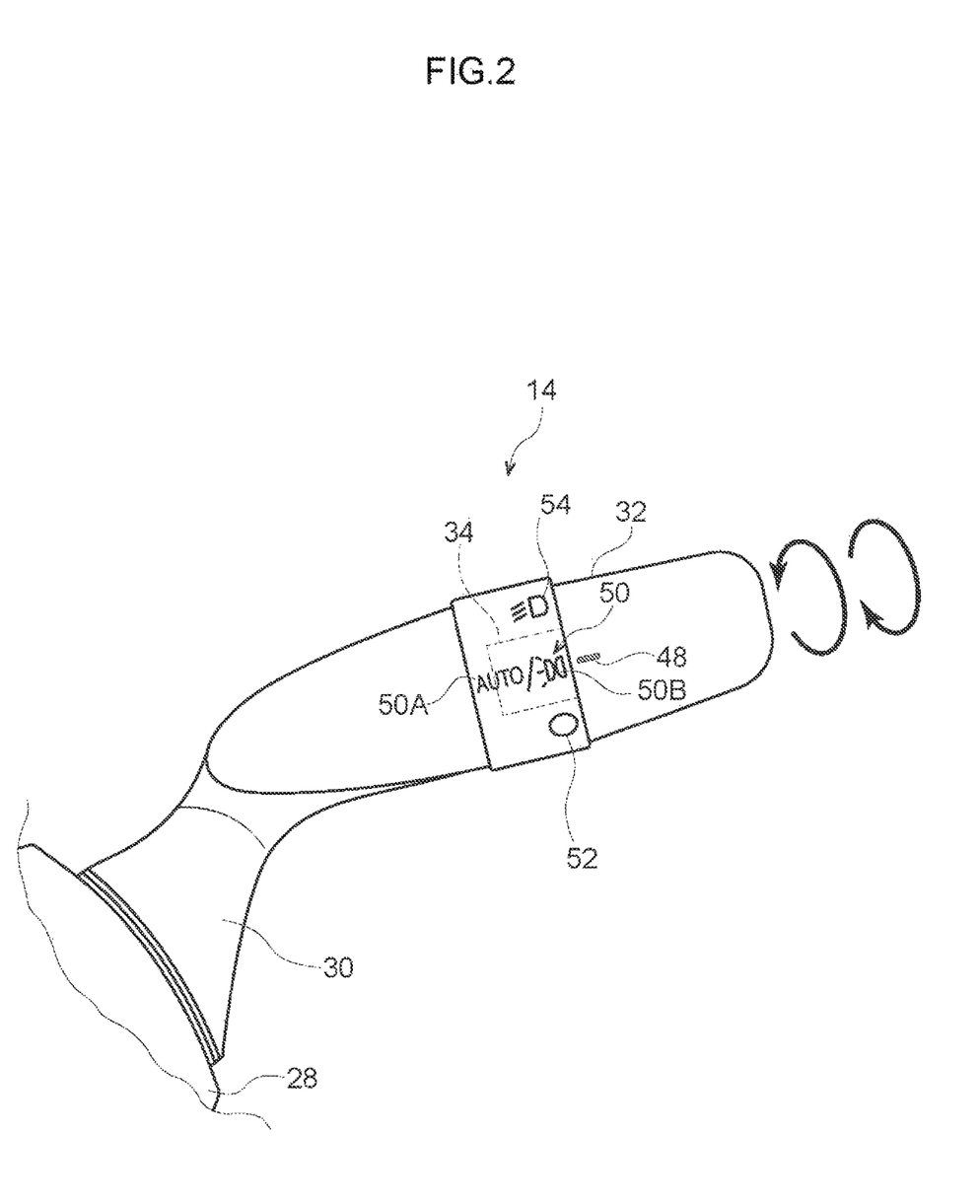
FIG. 2 is a face-on view schematically illustrating a configuration of a lever switch configuring part of a vehicle headlight system according to the present exemplary embodiment.

As illustrated in FIG. 2, the lever switch 14 is attached to a steering column 28 that supports a steering wheel 26 disposed on a vehicle width direction right side in a front section of the vehicle 12. Namely, in the present exemplary embodiment the vehicle 12 is a right hand drive vehicle.

Moreover, the lever switch 14 includes a "lever body 30", an "operation section 32", and a "biasing section 34".

The lever body 30 extends from the steering column 28 toward the vehicle width direction right side, and a non-illustrated rotary switch is inbuilt into a portion on a distal end side thereof.

Figure 6A:
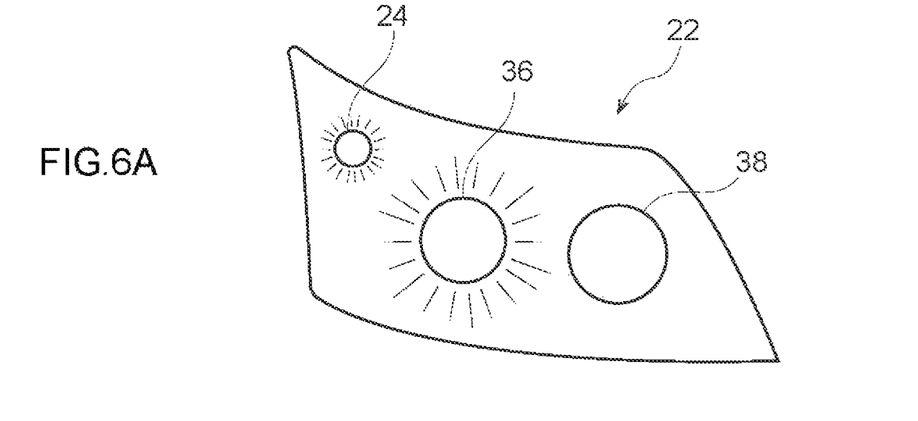
FIG. 6A is a face-on view illustrating each state of a light unit configuring part of a vehicle headlight system according to the present exemplary embodiment, and illustrates an all illumination state of a light unit.
Figure 6B:
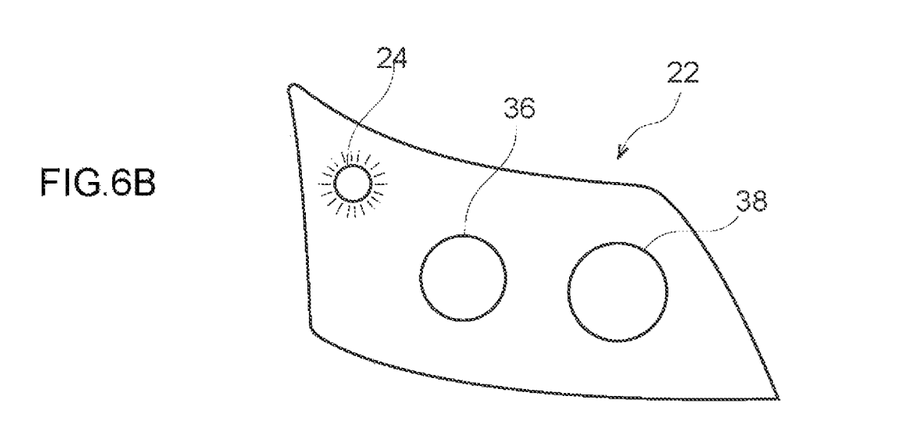
FIG. 6B is a face-on view illustrating each state of a light unit configuring part of a vehicle headlight system according to the present exemplary embodiment, and illustrates a state of a light unit when the vehicle sidelights are illuminated.
Figure 6C:
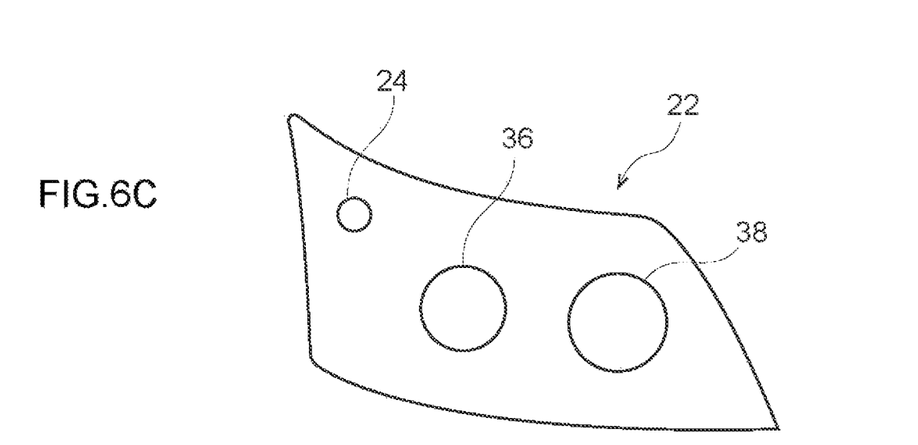
FIG. 6C is a face-on view illustrating each state of a light unit configuring part of a vehicle headlight system according to the present exemplary embodiment, and illustrates an all switched-off state of a light unit.

The lever body 30 is capable of being swung toward a vehicle front side and toward a vehicle rear side with respect to the steering column 28. When "low-beam headlights 36" (hereafter referred to as headlights 36) of the light unit 22 are illuminated, a driver is able to illuminate open-road running headlights 38 (hereafter referred to as high beam lights 38)

by swinging the lever body 30 toward the vehicle front side (see FIG. 6A to FIG. 6C). Note that when the driver has swung the lever body 30 toward the vehicle rear side, illumination of the high beam lights 38 is enabled while operation input force is being applied to the lever body 30.

Furthermore, the lever body 30 is able to be swung toward the vehicle upper side and the vehicle lower side with respect to the steering column 28, and the driver is able to operate non-illustrated direction indicators by swinging the lever body 30 in the vehicle up or down directions.

The operation section 32 is disposed at a distal end of the lever body 30, and is able to rotate about an axis of the lever body 30. More specifically, a non-illustrated axial portion of the operation section 32 is attached to a rotary switch of the lever body 30. As described later, a position of the rotary switch that changes under operation of the operation section 32 is detected by the control device 16, and the control device 16 is configured so as to control the illumination state of the light unit 22 based on this position.

Figure 3A:
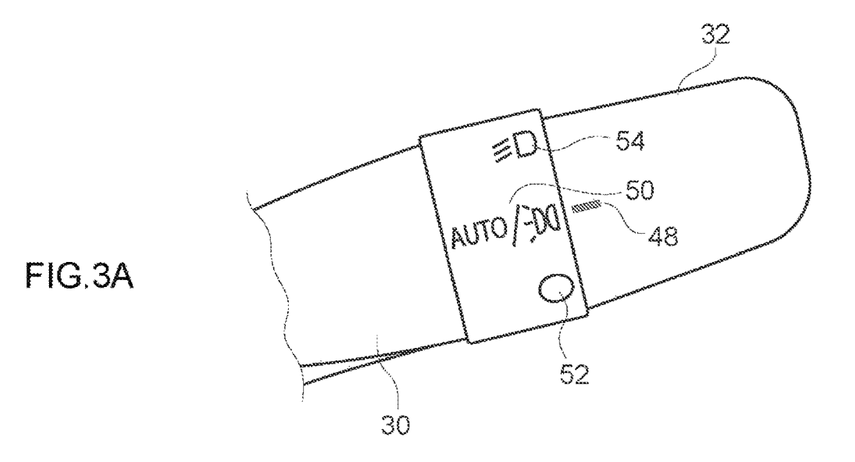
FIG. 3A is a face-on view illustrating each state of a lever switch configuring part of a vehicle headlight system according to the present exemplary embodiment, and illustrates a state of a lever switch when an operation section is at a first position.
Figure 3B:
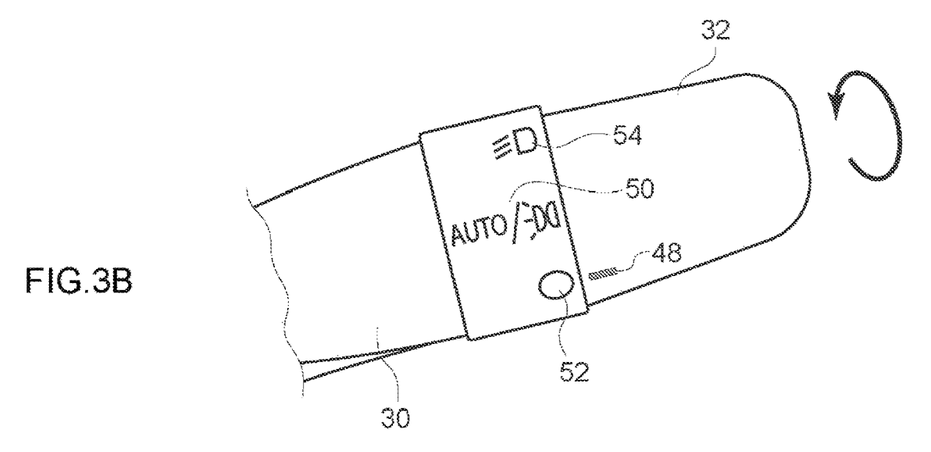
FIG. 3B is a face-on view illustrating each state of a lever switch configuring part of a vehicle headlight system according to the present exemplary embodiment, and illustrates a state of a lever switch when an operation section is at a second position.
Figure 3C:
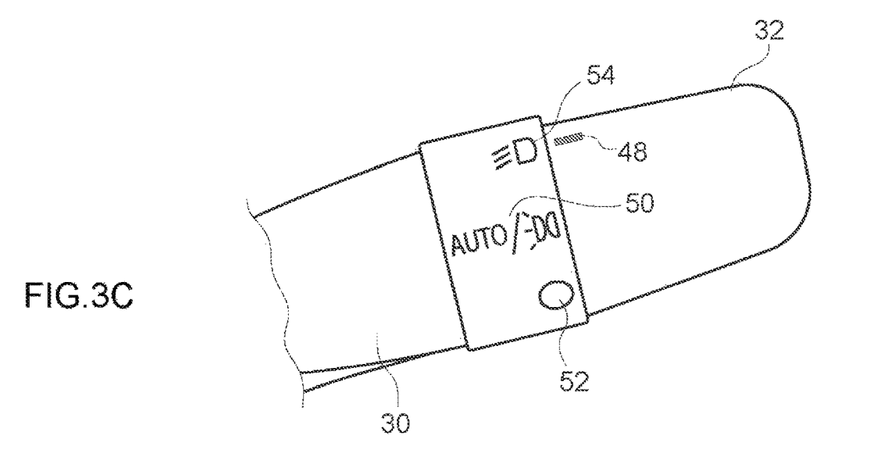
FIG. 3C is a face-on view illustrating each state of a lever switch configuring part of a vehicle headlight system according to the present exemplary embodiment, and illustrates a state of a lever switch when an operation section is at a third position.

The operation section 32 is able to adopt three positions with respect to the lever body 30, these being a first position illustrated in FIG. 3A, a second position illustrated in FIG. 3B, and a third position illustrated in FIG. 3C. In a state in which the operation section 32 has been rotated from the first position to the third position by operation of the driver in a clockwise direction as viewed from the vehicle width direction right side, the operation section 32 is configured so as to maintain this state of being at the third position.

However, in a state in which the operation section 32 has been rotated from the first position to the second position by operation of the driver in a counterclockwise direction as viewed from the vehicle width direction right side, the operation section 32 is configured so as to not be able to maintain this state of being at the second position unless operation force of the driver is acting thereon due to the operation section 32 receiving a biasing force from the biasing section 34.

More specifically, the biasing section 34 is configured including, for example, a torsion spring or the like interposed between the lever body 30 and the operation section 32. The biasing section 34 is configured so as to impart a biasing force to the operation section 32 so as to rotate the operation section 32 toward the first position side in a case in which the operation section 32 is rotated from the first position to the second position. Thereby, when the operation section 32 is in the state of being at the second position in the present exemplary embodiment, the operation section 32 is configured so as to return to the first position when an operation force from the driver is no longer acting on the operation section 32.

Next, description follows regarding a configuration of the control device 16. As illustrated in FIG. 4, the control device 16 is configured including a central processing unit (CPU) 16A serving as an example of a processor, read only memory (ROM) 16B, random access memory (RAM) 16C, storage 16D, and an input/output I/F (interface) 16E. The CPU 16A, the ROM 16B, the RAM 16C, the storage 16D, and the input/output I/F 16E are connected together through a bus 16F so as to be capable of communicating with each other.

The CPU 16A is a central processing unit and is able to execute various programs related to various control of the light unit 22. More specifically, the CPU 16A serving as a processor reads a program from the ROM 16B serving as memory, and is able to execute the program using the RAM 16C as workspace. The control device 16 is able to exhibit various functions by an execution program stored in the ROM 16B being read and executed by the CPU 16A, as described later.

The storage 16D serving as memory is configured including a hard disk drive (HDD) or a solid state drive (SSD), and is stored with various data including various programs including an operating system and various specification values of the vehicle 12 and the like.

The input/output I/F 16E is an interface for the control device 16 to communicate with each device installed in the vehicle 12. The control device 16 is connected to each later described device through the input/output I/F 16E so as to be able to communicate therewith. Note that these devices may be directly connected to the bus 16F.

More specifically, the input/output I/F 16E is connected to the lever switch 14, the light level sensor 18, the speed sensor 20, and the light unit 22.

Under operation by the driver, the lever switch 14 is able to switch the light unit 22 to an all illumination state, an automatic illumination state, and a vehicle sidelight illumination state.

More specifically, plural non-illustrated circuits are inbuilt into the rotary switch of the lever switch 14, in a configuration such that these circuits are switched by switching the position of the operation section 32 between the first position, the second position, and the third position.

The input/output I/F 16E is connected to the lever switch 14 through the plural non-illustrated circuits, in a configuration such that connection states of these circuits are switched by the position of the operation section 32 being switched between the first position, the second position, and the third position. The input/output I/F 16E detects a position of the operation section 32 from the connection states of the circuits, in a configuration such that the control device 16 controls the light unit 22 based on the position of the operation section 32.

The light level sensor 18 is able to detect the light level at the periphery of the vehicle 12. The light level sensor 18 is configured including, for example, a phototransistor and a photodiode, and is installed at a specific position where it is able to receive light from outside the vehicle through a non-illustrated windshield glass, such on an upper face of a non-illustrated instrument panel of the vehicle 12. Configuration is such that a light level signal is output to the control device 16 to indicate the light level in the periphery of the vehicle 12 as detected by the light level sensor 18.

The speed sensor 20 is provided to a non-illustrated drive shaft or the like that rotates as one with non-illustrated driven wheels of the vehicle 12, and is configured to output a rotation speed signal (pulse signal) to the control device 16 based on rotation speed of the driven wheels.

As illustrated in FIG. 6A to FIG. 6C, the light unit 22 includes, in addition to the headlights 36 and the high beam lights 38 described above, "vehicle sidelights 24" (hereafter referred to as small lamps 24). Configuration is such that the illumination state of the light unit 22 is controlled by the control device 16.

Figure 5:
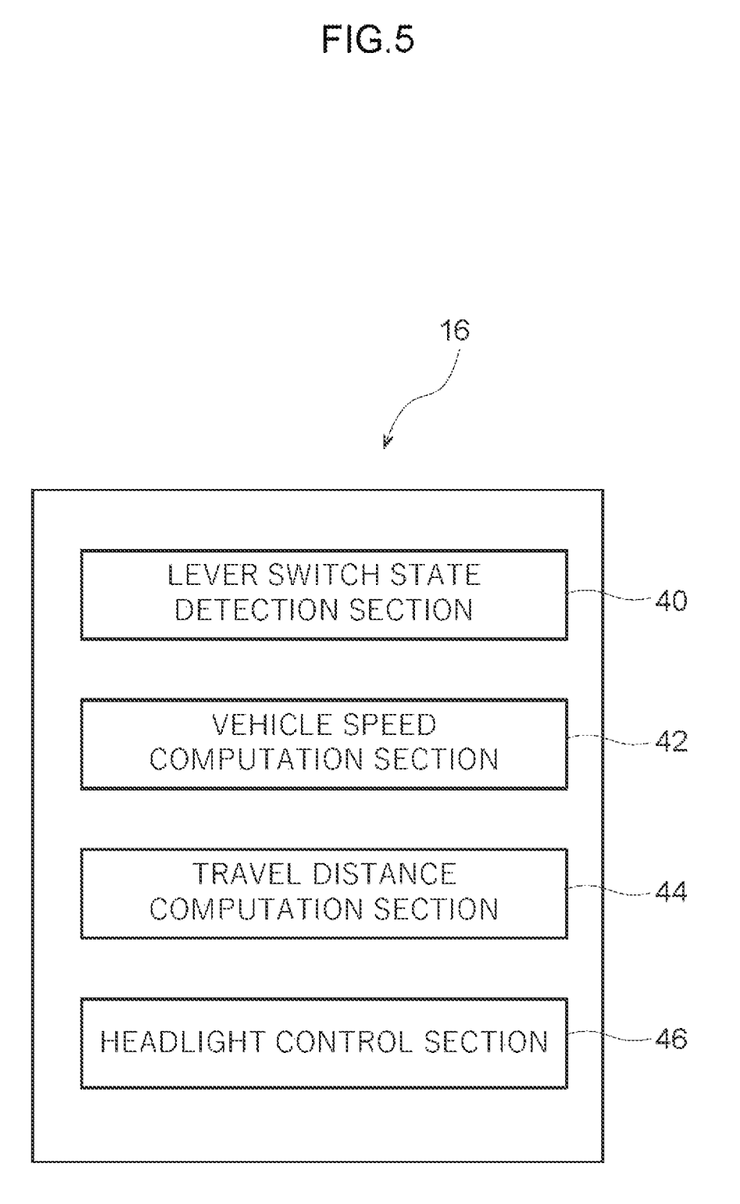
FIG. 5 is a block diagram illustrating a functional configuration of a control device for controlling part of the vehicle headlight system according to the present exemplary embodiment.

Next, description follows regarding a functional configuration of the control device 16, with reference to FIG. 5. The CPU 16A reads and executes an execution program stored in the ROM 16B so as to cause the control device 16 to function as a collective body of a lever switch state detection section 40, a vehicle speed computation section 42, a travel distance computation section 44, and a "headlight control section 46".

Based on the connection state with the rotary switches of the lever switch 14, the lever switch state detection section 40 detects the position of the operation section 32 as one of the first position, the second position, or the third position. The lever switch state detection section 40 transmits a first position signal to the headlight control section 46 in a case in which the operation section 32 is at the first position, transmits a second position signal to the headlight control section 46 in a case in which the operation section 32 is at the second position, and transmits a third position signal to the headlight control section 46 in a case in which the operation section 32 is at the third position.

The vehicle speed computation section 42 computes the speed of the vehicle 12 based on the rotation speed signal transmitted from the speed sensor 20 and on the external diameter of the driven wheels, as stored in the storage 16D. The vehicle speed computation section 42 is configured so as to transmit a vehicle speed signal based on the speed of the vehicle 12 to the headlight control section 46.

Based on the vehicle speed signal transmitted from the vehicle speed computation section 42, the travel distance computation section 44 is able to compute a travel distance of the vehicle 12 in a specific period of time and a cumulative travel distance of the vehicle 12 from a specific time up to the current time. The travel distance computation section 44 is configured so as to transmit a distance signal based on the cumulative travel distance of the vehicle 12 to the headlight control section 46.

The headlight control section 46 is configured so as to control the illumination state of the light unit 22 based on the first to third position signals transmitted from the lever switch state detection section 40, the light level signal transmitted from the light level sensor 18, the vehicle speed signal transmitted from the vehicle speed computation section 42, and the distance signal transmitted from the travel distance computation section 44.

More specifically, the headlight control section 46 switches the light unit 22 to the automatic illumination state when in a state in which the first position signal is being transmitted from the lever switch state detection section 40. In the automatic illumination state of the light unit 22, the headlight control section 46 is configured so as to illuminate the headlights 36 and the small lamps 24, as illustrated in FIG. 6A, when determined that the light level of the vehicle 12 is at a specific light level or lower based on the light level signal transmitted from the light level sensor 18 and that the vehicle 12 is traveling (for example, at a vehicle speed faster than 15 km/h) based on the vehicle speed signal transmitted from the vehicle speed computation section 42.

When the second position signal is being transmitted from the lever switch state detection section 40, the headlight control section 46 is configured so as to control the illumination state of the light unit 22 based on a duration of continued transmission of the second position signal, the vehicle speed signal transmitted from the vehicle speed computation section 42, and on the distance signal transmitted from the travel distance computation section 44.

More specifically, when the continuous duration of transmission of the second position signal is shorter than a specific period of time (for example, 0.1 s), the headlight control section 46 is configured so as to switch the light unit 22 to the vehicle sidelight illumination state, as illustrated in FIG. 6B, such that the headlights 36 are in a switched-off state, and only the small lamps 24 are illuminated.

Note that the headlight control section 46 is configured so as to maintain the vehicle sidelight illumination state of the light unit 22 in cases in which the headlight control section 46 has determined that the vehicle 12 is stopped, or that travel of the vehicle 12 at not more than a specific speed (for example, 15 km/h) is for a movement distance of a specific distance (for example 100 m) or less, based on the vehicle speed signal transmitted from the vehicle speed computation section 42 and on the distance signal transmitted from the travel distance computation section 44.

Namely, in cases in which the vehicle 12 is traveling at a speed faster than the specific speed, the headlight control section 46 is configured so as to maintain the illumination state of the headlights 36 and small lamps 24 even though the second position signal is being transmitted from the lever switch state detection section 40 to the headlight control section 46.

Note that when in the vehicle sidelight illumination state of the light unit 22, if the operation section 32 is returned to the first position then the light unit 22 transitions to the automatic illumination state, however in such cases, the illumination state of the small lamps 24 is maintained and the headlights 36 are illuminated by the vehicle 12 traveling. Namely, although the light unit 22 transitions to the automatic illumination state, the appearance is of the light unit 22 being maintained in the vehicle sidelight illumination state when the vehicle 12 is stopped or in a state in which the vehicle 12 moves a distance of not more than the specific distance at a speed of not more than the specific speed.

However, when the continuous duration of transmission of the second position signal has been for a time of the specific period of time (for example, 0.1 s) or greater, then the headlight control section 46 is configured so as to switch the light unit 22 to the all switched-off state, and as illustrated in FIG. 6C, extinguishes the headlights 36 and the small lamps 24.

Moreover, the headlight control section 46 also switches the light unit 22 to the all illumination state in a state in which the third position signal has been transmitted from the lever switch state detection section 40. The headlight control section 46 is configured so as to illuminate the headlights 36 and the small lamps 24 in the all illumination state of the light unit 22.

In addition, in the present exemplary embodiment, as illustrated in FIG. 2, a driver is able to ascertain the illumination state of the light unit 22 from a "mode selection mark 48" serving as a first display portion provided to the operation section 32, from an "automatic/vehicle sidelights mark 50" serving as a second display portion provided to the lever body 30, and from an OFF mark 52 and a headlight mark 54.

More specifically, the mode selection mark 48 is arranged at a vehicle up-down direction central portion of the lever body 30 side end of the operation section 32 as viewed by the driver in a case in which the operation section 32 is at the first position. The mode selection mark 48 is formed by engraving the operation section 32 using a laser marker or the like, and extends in a straight line shape along the vehicle width direction. The relative position of the operation section 32 with respect to the lever body 30 is able to be indicated by the mode selection mark 48.

The automatic/vehicle sidelights mark 50 is configured including an automatic mark 50A that is a pictogram indicating the automatic illumination state of the light unit 22, and a vehicle sidelights mark 50B that is a pictogram indicating the vehicle sidelight illumination state of the light unit 22. The automatic/vehicle sidelights mark 50 is formed by engraving the lever body 30 using a laser marker or the like, and is arranged on the lever body 30 at a position adjacent to the mode selection mark 48 in a case in which the operation section 32 is at the first position.

The OFF mark 52 is a pictogram indicating the all switched-off state of the light unit 22, and is formed by engraving the lever body 30 using a laser marker or the like. The OFF mark 52 is arranged at a position on the lever body 30 adjacent to the mode selection mark 48 in a case in which the operation section 32 is at the second position.

The headlight mark 54 is a pictogram indicating the all illumination state of the light unit 22, and is formed by engraving the lever body 30 using a laser marker or the like. The headlight mark 54 is arranged at a position on the lever body 30 adjacent to the mode selection mark 48 when the position of the operation section 32 is the third position.

Operation and Advantageous Effects of Present Exemplary Embodiment

Next, description follows regarding the operation and advantageous effect of the present exemplary embodiment.

As illustrated in FIG. 2, the vehicle headlight system 10 according to the present exemplary embodiment includes the operation section 32 that is rotatable with respect to the lever body 30, and as illustrated in FIG. 3A and FIG. 3B, the operation section 32 is able to adopt a first position and a second position by being rotated with respect to the lever body 30.

In the present exemplary embodiment, in a case in which the operation section 32 is at the second position, the operation section 32 is returned to the first position by the operation section 32 being rotated by the biasing section 34. Namely, the operation section 32 needs to be supported such that the operation section 32 is not rotated in order to maintain the state of the operation section 32 positioned at the second position.

Moreover, as illustrated in FIG. 5, the present exemplary embodiment includes the headlight control section 46, and the headlight control section 46 is able to set the automatic illumination state in which the illumination state of the small lamps 24 and the headlights 36 are automatically switched in a case in which the operation section 32 is at the first position.

The headlight control section 46 is also able to extinguish the small lamps 24 and the headlights 36 in a case in which the operation section 32 is at the second position for a specific period of time or greater.

Furthermore, the headlight control section 46 is able to set the vehicle sidelight illumination state in which only the small lamps 24 are illuminated in a case in which the operation section 32 is at the second position for a shorter period of time than the specific period of time.

Figure 7:
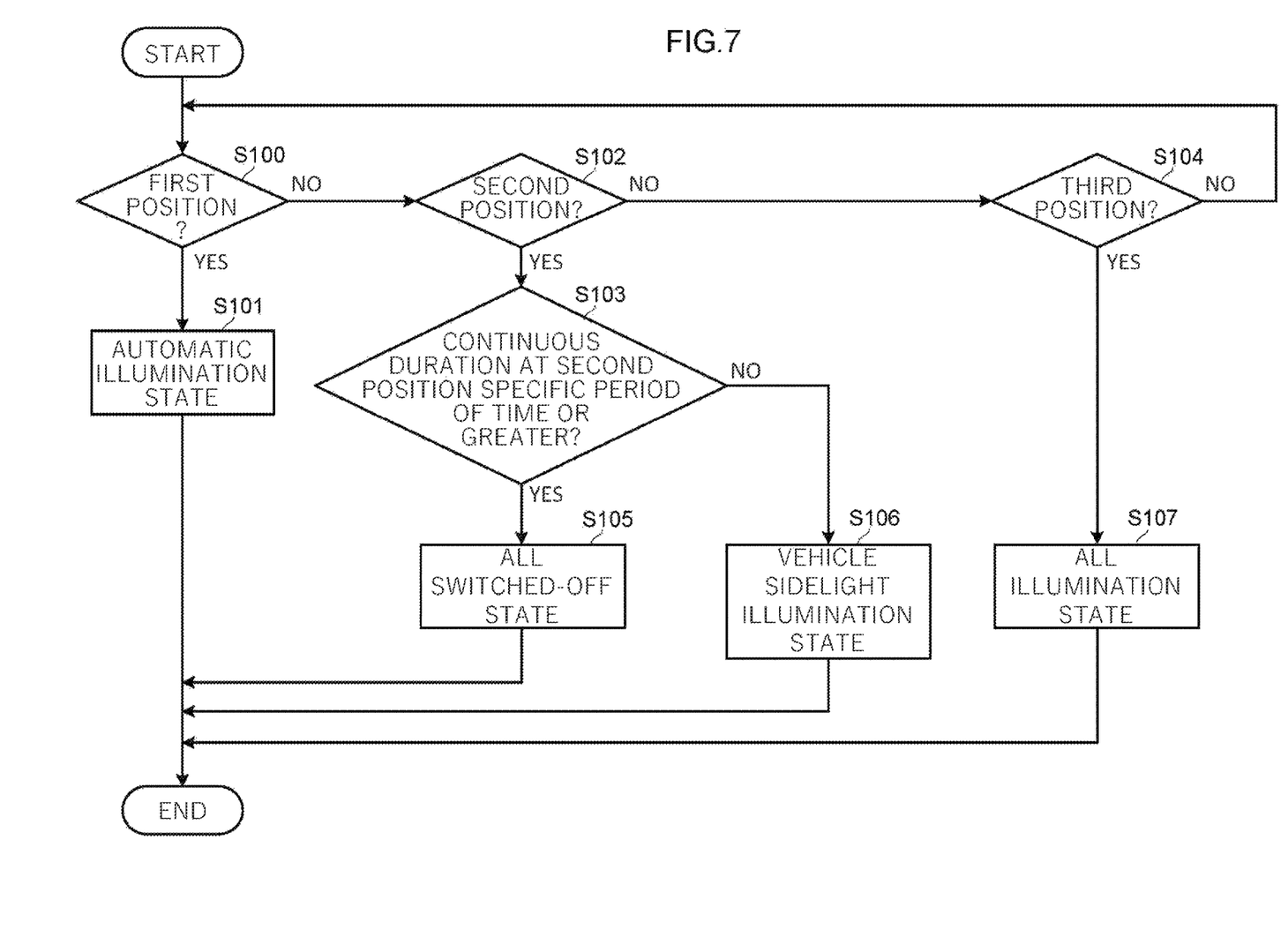
FIG. 7 is a flowchart illustrating a flow of control of a headlight by the control device configuring part of a vehicle headlight system according to the present exemplary embodiment.

Description follows regarding a flow of control related to transitioning of the illumination state of the light unit 22 by the control device 16, mainly with reference to the flowchart of FIG. 7. The control flow is started by the CPU 16A receiving a specific instruction signal at intervals of a specific period of time.

When the control flow has been started, at step S100 the CPU 16A functions as the lever switch state detection section 40 and determines whether or not the position of the operation section 32 is the first position. Then processing proceeds to step S101 in cases in which the CPU 16A has determined the position of the operation section 32 to be the first position (step S100: YES), and processing proceeds to step S102 in cases in which the position of the operation section 32 is determined not to be the first position (step S100: NO).

At step S101, the CPU 16A functions as the headlight control section 46 and sets the light unit 22 to the automatic illumination state, and the control flow is then ended.

At step S102, the CPU 16A functions as the lever switch state detection section 40, and determines whether or not the position of the operation section 32 is the second position. Then processing proceeds to step S103 in cases in which the CPU 16A has determined the position of the operation section 32 to be the second position (step S102: YES), and processing proceeds to step S104 in cases in which the operation section 32 is determined not to be at the second position (step S102: NO).

At step S103, the CPU 16A functions as the headlight control section 46 and determines whether or not the time that the operation section 32 has been at the second position is the specific period of time or greater. Processing proceeds to step S105 in cases in which the CPU 16A has determined a duration the operation section 32 has been at the second position to be the specific period of time or greater (step S103: YES), and processing proceeds to step S106 in cases in which determination is that the duration the operation section 32 has been at the second position is shorter than the specific period of time (step S103: NO).

At step S105, the CPU 16A functions as the headlight control section 46 and sets the light unit 22 to the all switched-off state, and the control flow is then ended.

At step S106, the CPU 16A functions as the headlight control section 46 and sets the light unit 22 to the vehicle sidelight illumination state, and the control flow is then ended.

At step S104, the CPU 16A functions as the lever switch state detection section 40, and determines whether or not the position of the operation section 32 is the third position. Then processing proceeds to step S107 in cases in which the CPU 16A has determined that the operation section 32 is at the third position (step S104: YES), and processing returns to step S100 in cases in which determination is that the operation section 32 is not at the third position (step S104: NO).

At step S107 the CPU 16A functions as the headlight control section 46 and sets the light unit 22 to the all illumination state, and the control flow is then ended.

Returning to FIG. 3A to FIG. 3C, the present exemplary embodiment enables the relative position of the operation section 32 with respect to the lever body 30 to be indicated by the mode selection mark 48. This thereby enables, for example, the driver to ascertain the state of the headlights of the vehicle 12, such as by the automatic mark 50A indicating the automatic illumination state and the vehicle sidelights mark 50B indicating the vehicle sidelight illumination state, and the other marks being provided at a position adjacent to the mode selection mark 48 in a case in which the operation section 32 is at each respective position. Note that at least one out of the small lamps 24 or the headlights 36 is included in the headlights referred to here.

However, as stated above, in the present exemplary embodiment sometimes the light unit 22 is in the automatic illumination state and sometimes in the vehicle sidelight illumination state in a case in which the operation section 32 is at the first position. Were one or other of the automatic mark 50A or the vehicle sidelights mark 50B alone to be provided at a position adjacent to the mode selection mark 48 in a case in which the operation section 32 is at the first position, then this might conceivably lead to the driver of the vehicle 12 feeling confused about the state of the headlights of the vehicle 12 depending on the actual state of the headlights of the vehicle 12.

To address this issue, in the present exemplary embodiment the automatic/vehicle sidelights mark 50 is provided, and the automatic/vehicle sidelights mark 50 is arranged at a position adjacent to the mode selection mark 48 in a case in which the operation section 32 is at the first position to indicate either being in the automatic illumination state or in the vehicle sidelight illumination state.

This means that the driver of the vehicle 12 is able to ascertain that the state of the headlights is either the automatic illumination state or the vehicle sidelight illumination state by looking at the adjacent state of the mode selection mark 48 and the automatic/vehicle sidelights mark 50.

Thus the present exemplary embodiment is accordingly able to suppress a driver from feeling confused about the state of the headlights while also suppressing the vehicle 12 from traveling without lights.

Moreover, from a state in which the headlights 36 are illuminated, in the present exemplary embodiment the headlights 36 are switched off and the small lamps 24 are illuminated by the headlight control section 46 in a case in which the operation section 32 is at the second position. The present exemplary embodiment is thereby able to transition to the vehicle sidelight illumination state quickly based on operation of the driver.

Therefore, the operation of the driver is reflected quickly in the state of the small lamps 24, and driver can be suppressed from feeling confused about the state of the small lamps 24.

Moreover, in the present exemplary embodiment, a transition to the vehicle sidelight illumination state may also be performed by the headlight control section 46 performing control other than the control described above.

More specifically, when the continuous duration of transmission of the second position signal is a duration shorter than the specific period of time, the headlight control section 46 may transition the light unit 22 to the vehicle sidelight illumination state from when the first position signal is received, namely after the operation section 32 has returned to the first position.

In such a configuration, when from a state in which the headlights 36 are illuminated the operation section 32 has moved from the being at the second position to being at the first position, the headlights 36 are switched off and the small lamps 24 are illuminated by the headlight control section 46. This thereby enables the vehicle sidelight illumination state to be suppressed from occurring in the interval between in a case in which the operation section 32 is at the second position to when returned to the first position.

Thus the configuration described above enables the driver to ascertain easily the position of the operation section 32 when the small lamps 24 are illuminated.

Supplementary Explanation to Above Exemplary Embodiment (1) Although in the exemplary embodiment described above the mode selection mark 48 of the operation section 32, and the automatic/vehicle sidelights mark 50, the OFF mark 52, and the headlight mark 54 of the lever body 30 are engraved using a laser marker or the like, the configuration of each mark is not limited thereto. For example, depending on the specification and the like of the vehicle 12, these marks may be configured as a base and a separate body, such as a resin and metal or the like. Moreover, in order to raise the visibility of the above marks and for the driver to ascertain easily the illumination state of the headlights, these marks may be configured so as to be able to emit light under a pilot lamp such as a light emitting diode (LED) or the like, and the marks may be caused to emit light corresponding to the headlights that are illuminated.

(2) Although in the exemplary embodiment described above the vehicle 12 is a right hand drive vehicle, and so the lever switch 14 is disposed on the vehicle width direction right side of the steering column 28, the position of the lever switch 14 is not limited thereto. In cases in which the vehicle 12 is a left hand drive vehicle, the lever switch 14 may be disposed on the vehicle width direction left side of the steering column 28.

What is claimed is:

1. A vehicle headlight control system, comprising:
    an operation section configured to adopt a first position and a second position by being rotated with respect to a lever body;
    a biasing section that returns the operation section to the first position in a case in which the operation section has been rotated toward a second position side;
    a processor coupled to a memory, the processor configured to:
        enable an illumination state of vehicle sidelights and low-beam headlights to be switched automatically in a case in which the operation section is at the first position,
        enable the low-beam headlights and the vehicle sidelights to be switched off in a case in which the operation section is at the second position for a specific period of time or greater, and
        enable the vehicle sidelights to be illuminated in a case in which the operation section is at the second position for a duration shorter than the specific period of time;
    a first display portion that indicates a relative position of the operation section with respect to the lever body; and
    a second display portion that is adjacent to the first display portion in a case in which the operation section is at the first position, and that indicates either being in an automatic illumination state in which the illumination state of the vehicle sidelights and the low-beam headlights is switchable automatically or being in a vehicle sidelight illumination state in which the vehicle sidelights are illuminated.

2. The vehicle headlight control system of claim 1, wherein the processor is further configured to, in a state in which the low-beam headlights are illuminated, switch off the low-beam headlights and illuminate the vehicle sidelights in a case in which the operation section has reached the second position.

3. The vehicle headlight control system of claim 1, wherein the processor is further configured to, in a state in which the low-beam headlights are illuminated, switch off the low-beam headlights and illuminate the vehicle sidelights in a case in which the operation section has reached the first position from being at the second position.

* * * * *